Oct. 22, 1957 G. H. AMBLER ET AL 2,810,164
DRIVING OF ROTATABLE SHAFTS
Filed Jan. 3, 1951 4 Sheets-Sheet 1
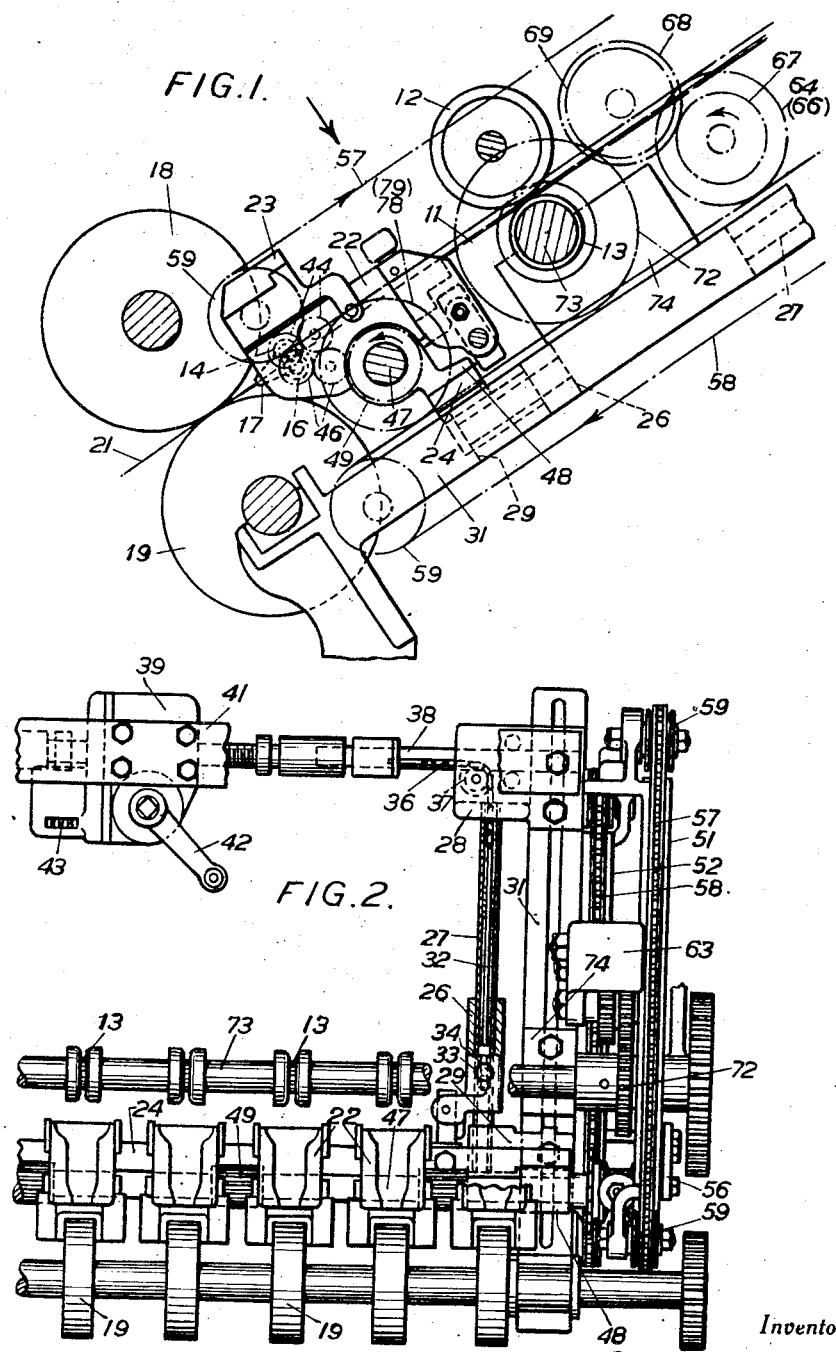
Inventors
GEOFFREY HILL AMBLER.
WILLIAM RAMSDALE COLLIER.
By Ward, Crosby & Neal
Attorneys Oct. 22, 1957  G. H. AMBLER ET AL  2,810,164
DRIVING OF ROTATABLE SHAFTS
Filed Jan. 3, 1951  4 Sheets-Sheet 2
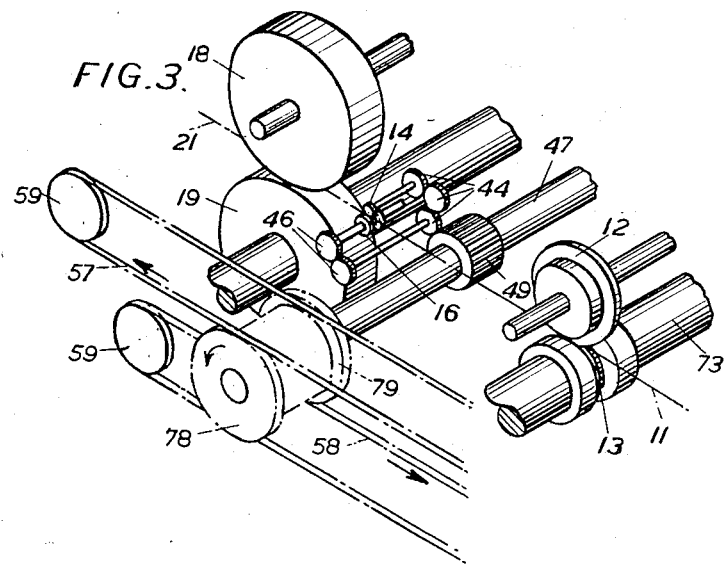
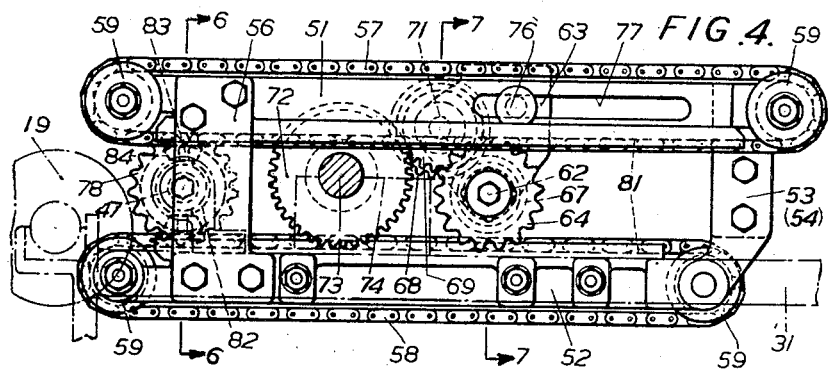
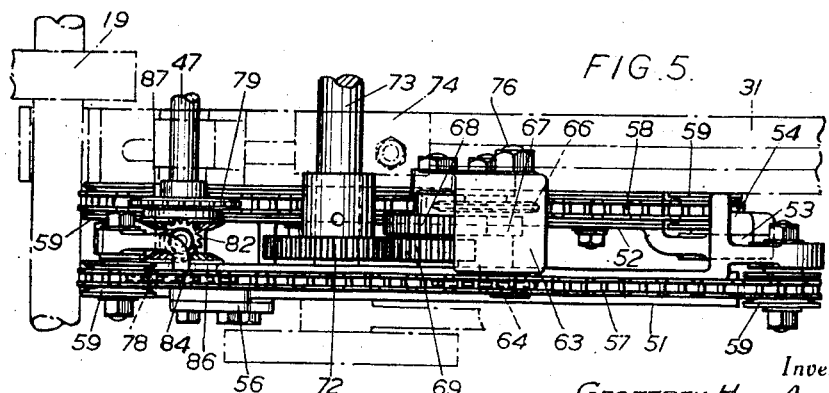
Inventors
GEOFFREY HILL AMBLER.
WILLIAM RAMSDALE COLLIER.
By
Ward, Crosby + Neal
Attorneys Oct. 22, 1957　　　G. H. AMBLER ET AL　　　2,810,164
DRIVING OF ROTATABLE SHAFTS
Filed Jan. 3, 1951　　　　　　　　　　　　　4 Sheets-Sheet 3
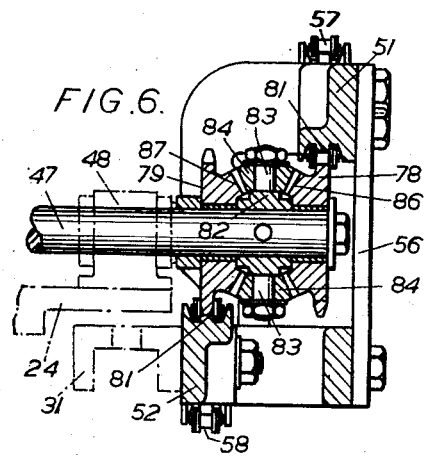
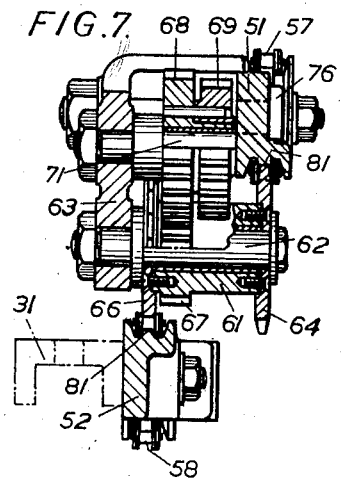
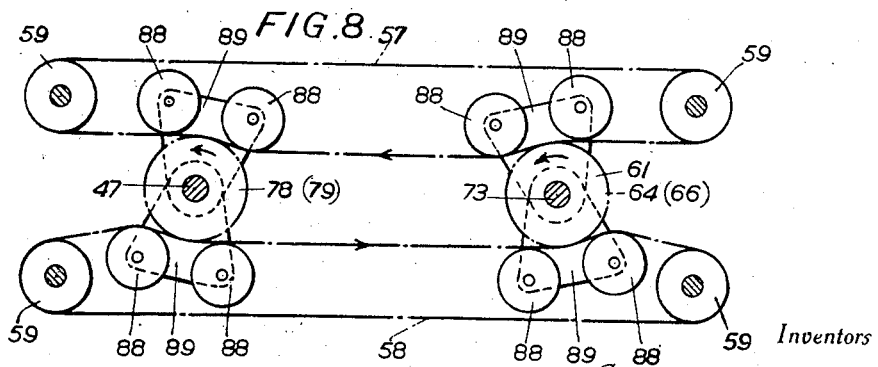
Inventors
GEOFFREY HILL AMBLER.
WILLIAM RAMSDALE COLLIER.
By
Ward, Crosby & Neal
Attorneys.

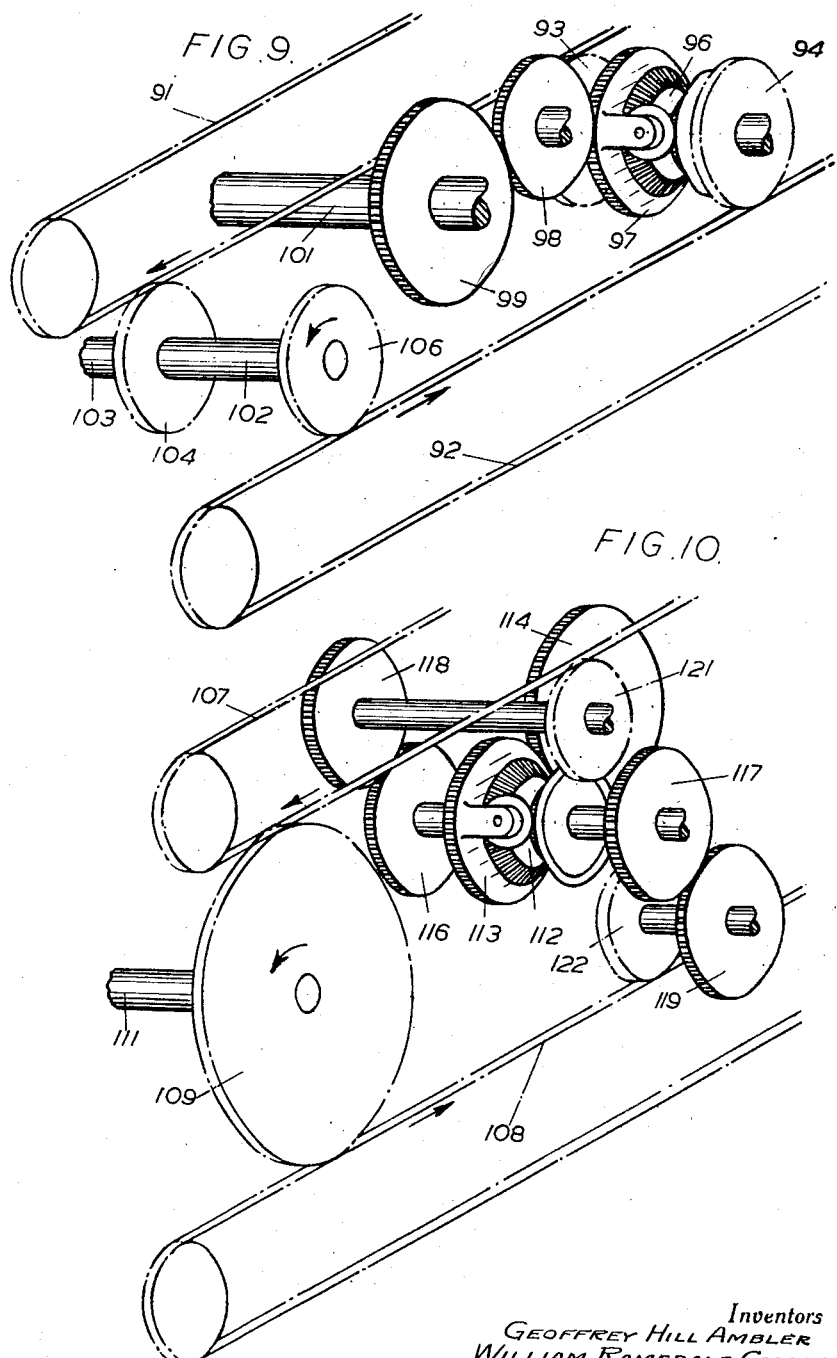

United States Patent Office 2,810,164
Patented Oct. 22, 1957

2,810,164
DRIVING OF ROTATABLE SHAFTS

Geoffrey Hill Ambler and William Ramsdale Collier, Ilkley, England, assignors to Ambler Superdraft Limited, Ilkley, England, a British company Application January 3, 1951, Serial No. 204,205

Claims priority, application Great Britain January 21, 1950

16 Claims. (Cl. 19—130)

This invention relates to the driving of rotatable shafts, and is particularly, though not exclusively, concerned with the driving of shafts that are adjustable (especially during rotation) from one position to another in a direction transverse to the axis of rotation. An object of the invention is to reduce substantially the application of load to the shaft bearings by the driving torque.

According to the present invention, a shaft is rotated by a pair of members adapted to cause substantially equal torques to be applied in the same sense to the shaft at substantially diametrically opposed points, the torques being applied concomitantly to the shaft by interaction between the two members and a differential gear.

The differential gear may be arranged to connect the two members and the shaft, the two members driving the differential gear which in turn transmits the torque from the two members to the shaft. Alternatively, the two members may themselves be driven by a pair of rotatable members connected by a differential gear, the two members then applying torque directly to the shaft at the diametrically opposed points. In both cases, the interaction between the two members and the differential gear causes the torque to be applied to the shaft at the diametrically opposed points concomitantly, thus ensuring that the load normally applied to the shaft bearings as a result of the driving torque applied by each of the two members is opposed by a similar load arising from the torque applied by the other member, so that the shaft bearings remain substantially free from any load arising from the driving torque.

The pair of members may be constituted by a pair of opposed parallel chains each arranged to apply torque to one of a pair of sprockets freely mounted co-axially with the shaft, the torque being applied to each sprocket at a point diametrically opposed to the point of application on the other sprocket and transmitted from the two sprockets to the shaft through a differential gear connecting the two sprockets. The two chains are driven by a common driving member. Such an arrangement is particularly effective for driving a shaft arranged for adjustment in a direction transverse to the axis of rotation, the two chains forming a track along which the two driven sprockets roll during adjustment of the shaft.

In an alternative construction, the two chains themselves may be driven by a pair of sprockets connected by a differential gear, the chains then being arranged in engagement at diametrically opposed points with a pair of sprockets secured to the shaft, or (by arranging the chains in a common plane) with a single sprocket secured to the shaft.

Because of the tendency of the chains to lift from their sprockets at the point of application of the driving torque, it is preferable to employ chain guides at these points, the chains then running between the sprockets and the guides. Alternatively, pairs of guide rollers freely mounted in carrier members swung from the axes of the driving and driven shafts may be used, the pairs of guide rollers constraining the chains to engage the sprockets over a given arc of contact.

The differential gear is conveniently of the bevel gear type and consists of a pair of bevel gears secured one to each of the sprockets (or other driven or driving members) and both meshing with a pair of bevel pinions freely rotatable on diametrically opposed shafts extending radially from a carrier member through which the drive is transmitted.

While applicable to the driving of rotatable shafts generally, the invention has been found particularly useful as applied to the driving, in apparatus for drafting textile fibres (particularly high drafting apparatus), of shafts that are arranged for adjustment in a direction transverse to the axis of rotation.

Such a drafting apparatus was described in copending application Serial No. 18,524 (now abandoned in favor of continuation-in-part application Serial No. 151,136 on which Patent No. 2,641,026 has been granted), and the invention will now be described in greater detail with reference to the accompanying diagrammatic drawings, as applied to that apparatus.

In the drawings:

Figure 1 is an elevation of the drafting apparatus;

Figure 2 is a plan of the drafting apparatus viewed in the direction of the arrow in Figure 1, and drawn to a smaller scale;

Figure 3 is an isometric diagram showing part of the gearing of Figure 1;

Figure 4 is an elevation of part of the driving gear of Figure 1, assumed to lie horizontally;

Figure 5 is a plan of the gear shown in Figure 4;

Figure 6 is a section taken on the line 6—6 in Figure 4;

Figure 7 is a section taken on the line 7—7 in Figure 4;

Figure 8 is a diagram illustrating a modified construction of the gear shown in Figure 4, and Figures 9 and 10 are schematic diagrams illustrating alternative constructions of the gear shown in Figure 4.

Referring first to Figures 1 to 3, a roving 11 passes through feed rollers 12 and 13, intermediate rollers 14 and 16, and then through a flume 17 to the nip of drafting rollers 18 and 19 from which it passes in the form of a yarn 21 to the bobbin of a spinning device of known construction.

The intermediate rollers 14 and 16 and the flume 17 are mounted in an intermediate unit generally referred to by reference numeral 22, the lower roller 16 being rotatably mounted in the body of the unit while the upper roller 14 is rotatably mounted in a supporting bracket 23 pivotally mounted on the unit. A plurality of units 22 (one for each spindle of the apparatus) are arranged side by side along the length of the drafting apparatus, each unit being arranged between pairs of feed and drafting rollers.

The units 22 are arranged in sections, each unit being detachably mounted on a common supporting member 24. The supporting member 24 of each section is secured to brackets 26 slidably mounted on tubular supports 27 mounted in upper and lower brackets 28 and 29 secured to the main framework 31 of the apparatus. A rod 32 is slidably mounted in each of the tubular supports 27 and is secured at the lower end to the corresponding bracket 29 by means of a stud 33 passing through a slot 34 in the tubular support 27. The rod 32 is yieldably urged, e. g., by spring means (not shown) towards the drafting rollers and is attached at its upper end to one end of a chain 36 passing over a guide pulley 37 and being attached to a common adjusting bar 38 extending along the length of the apparatus.

In the section illustrated in Figure 2, the adjusting bar 38 is divided for the insertion of an adjusting unit 39 mounted on a supporting bar 41 secured to the brackets 28. Upon rotation of the controlling handle 42 of the adjusting unit 39, the bar 38 is moved longitudinally, and it will be seen that such movement causes the various sections of units 22 to be adjusted simultaneously towards or away from the nip of the drafting rollers 18 and 19, as required for different degrees of draft. A measuring device 43 is incorporated in the unit 38, to indicate the degree of adjustment made.

The intermediate rollers 14 and 16 are driven by gear trains 44 and 46, respectively, from a common driving shaft 47 rotatably mounted in bearing members 48 secured to the common supporting member 24 and to which is secured a series of gears 49 for driving the gear trains 44 and 46.

As explained in the above-mentioned copending application, the method of and apparatus for high drafting there described allows yarns of different counts to be spun from the same roving, a change in yarn counts necessitating a change in draft which, in turn, necessitates adjustment of the intermediate rollers towards or away from the nip of the drafting rollers; hence the adjusting mechanism described above. Whilst, however, the necessary adjustment of the apparatus for a change in draft is effected while the apparatus is stationary, it is very desirable to adjust the intermediate rollers during operation of the apparatus; firstly because of the rapid diminution of the cross-sectional area of the roving as it approaches the nip of the drafting rollers and the consequent tendency of the "ends" to break if the adjustment is made while the apparatus is stationary; and secondly, to allow final adjustment to be made, if necessary, after inspection of the initial yarn spun at the new counts. The present invention readily permits such adjustment, the common driving shaft 47 being driven in the following manner:

Secured to the main framework 31 at one end of the apparatus is a supporting framework (see particularly Figures 4 to 7) consisting of upper and lower frame members 51 and 52 connected at one end by opposed lugs 53 and 54 and at the other end by a spacing member 56. Upper and lower endless chains 57 and 58 are mounted on supporting rollers 59 freely mounted in the frame members 51 and 52. The chains 57 and 58 are spaced somewhat in an axial direction and are driven by a common driving member 61 freely mounted on a stud 62 extending from a bearing bracket 63 depending from the upper frame member 51. The driving member 61 is disposed between the adjacent laps of the chains 57 and 58, and is formed with two sprockets 64 and 66, the sprocket 64 being arranged in engagement with the lower lap of the upper chain 57 while the sprocket 66 engages the upper lap of the lower chain 58. The common driving member 61 is also formed with a gear 67 arranged in engagement with one gear 68 of a double intermediate gear 68, 69, rotatably mounted on a stud 71 extending from the bearing bracket 63, the other gear 69 being arranged in engagement with a gear 72 secured to the shaft 73 on which the lower feed rollers 13 are mounted, the shaft 73 being mounted in bearings 74 adjustably secured to the framework 31. The bearing bracket 63 is adjustably mounted on the frame member 51 by means of a stud 76 passing through a slot 77 in the member 51.

The lower lap of the upper chain 57 is arranged in engagement with the upper portion of a driven sprocket 78 freely mounted on the common driving shaft 47, while the upper lap of the lower chain 58 is arranged in engagement with the lower portion of a second driven sprocket 79 also freely mounted on the shaft 47, chain guide rails 81 being formed on the frame members 51 and 52 to resist the tendency of the chains 57 and 58 to move out of engagement with the teeth of the sprockets 78, 79 and 64, 66.

Secured to the common shaft 47 between the driven sprockets 78 and 79 is a carrier member 82 formed with a pair of diametrically opposed radial shafts 83 on which are freely mounted a pair of bevel pinions 84 both arranged in mesh with bevel gears 86 and 87 formed on the opposing faces of the driven sprockets 78 and 79, the construction constituting a differential gear. The drive to the common shaft 47 is thus obtained from the feed roller shaft 73, through the intermediate gear unit 68, 69 to the common driving member 61 and then by the pull of the adjacent laps of the two chains 57 and 58 on the upper and lower portions of the driven sprockets 78 and 79, respectively, thus transmitting the drive through the differential gear to the common shaft 47. It will thus be seen that by applying torque by the two chains 57 and 58 at diametrically opposed points on the two driven sprockets 78 and 79, and by causing the torques to be applied concomitantly through the interaction between the two chains and the differential gear, the loads applied to the shaft bearings 48 as a result of the driving torque are equal and opposite, except for a light couple introduced as a result of the lateral spacing of the driven sprockets 78 and 79, and there is thus no substantial resistance to the movement of the bracket 26 on the tubular supports 27 during the adjustment referred to above.

The arrangement readily permits the adjustment of the common shaft 47 during operation of the apparatus, the lower lap of the upper chain 57 and the upper lap of the lower chain 58 (which are arranged parallel to each other and to the tubular supports 27) constituting a track along which the two driven sprockets 78 and 79 roll during the adjustment. During such rolling, the sprockets 78 and 79 rotate in opposite directions, but despite the increased rate of rotation of one and the equally decreased rate of rotation of the other, arising from the opposite directions of movement of the driving laps of the chains 57 and 58, there is no appreciable effect on the rate of rotation of the carrier member 82 (and thus the common shaft 47) because the tendency of the one sprocket to increase the rate of rotation of the carrier member 82 is compensated by the tendency of the other sprocket to decrease the rate of rotation of the carrier member by the same amount.

This construction also permits adjustment of the feed roller shaft 73 without interfering with the drive to the intermediate rollers 14 and 16, it being only necessary to release the bearing bracket 63 and slide it along the slot 77 in the frame member 51 to allow movement of the feed roller shaft 73. After adjustment, the bearing bracket 63 is slid back until the gears are once more in engagement, and secured in the adjusted position.

Figure 8 illustrates the use of guide pulleys in place of the chain guides 81. Thus, as before, the two chains 57 and 58 are supported on pulleys 59 and driven by the common driving member 61, the two chains driving the sprockets 78 and 79. In this modification, however, the chains are constrained to engage the sprockets 78 and 79 and the sprockets 64 and 66 of the common driving member 61 over an arc of contact by pairs of guide pulleys 88 freely mounted in carrier members 89 freely pivoted for movement about the axes of the common driving shaft 73 and the driven shaft 47. The carrier members 89 and pulleys 88 are identical so that the arcs of contact are equal. The pairs of pulleys 88 are positioned by the tensioned portions of the chains 57 and 58, and since these tensions are equal and applied concomitantly (through the action of the differential gear connecting the sprockets 78 and 79) along parallel tangents, the arcs of contact of the chains are diametrically opposed.

In the modified construction illustrated in Figure 9, two parallel chains 91 and 92 are again used, but the chains themselves are differentially driven by sprockets 93 and 94 connected by a differential gear indicated generally by reference numeral 96, the carrier member of the differential gear being driven through a gear 97 (secured to the carrier member), an intermediate gear 98 and a driving gear 99 secured to a main driving shaft 101. The chains 91 and 92 then drive a common driven member 102 secured to the driven shaft 103 and formed with a pair of sprockets 104 and 106, the lower lap of the upper chain 91 engaging the upper portion of the sprocket 104 while the upper lap of the lower chain 92 engages the lower portion of the sprocket 106.

In the modified construction illustrated in Figure 10, two parallel chains 107 and 108 are arranged in a common plane, the adjacent laps of the chains engaging opposed portions of a single sprocket 109 secured to the driven shaft 111. In this case the carrier member of a differential gear 112 is again driven by gearing 113 and 114 from a main driving shaft. The differential gear 112, however, now connects two gears 116 and 117 arranged, respectively, in engagement with gears 118 and 119 to which are secured sprockets 121 and 122 arranged, respectively, to engage the adjacent laps of the chains 107 and 108.

In the construction illustrated in Figures 9 and 10, the compensating effect of the differential gears 96 (Figure 9) and 112 (Figure 10) on the two chains (91, 92, or 107, 108) allows the shafts 103 (Figure 9) and 111 (Figure 10) to be adjusted, in the manner described above with reference to the shaft 47, with the respective sprockets 104, 106 and 109 remaining in engagement with their chains.

What we claim is:

1. Mechanism for driving a rotatable shaft, comprising a pair of movable endless members having torque-applying portions extending in substantially opposed parallel relationship in directions transverse to the axis of the shaft to be driven, means for driving said endless members continuously at substantially the same uniform rate, a driving connection so arranged between said torque-applying portions and the shaft as to transmit the torque from said portions to the shaft in the same sense at substantially diametrically opposed points on the shaft, and a differential gear interacting with the two members to cause concomitant application of the torques to the shaft.

2. Mechanism for driving a rotatable shaft, comprising a pair of sprockets freely mounted on the shaft, a carrier member secured to the shaft, differential gearing connecting the two sprockets and the carrier member so as to cause concomitant transmission to the shaft of torques applied to the two sprockets, a pair of endless chains each engaging one of said sprockets to apply torque thereto, the chains being arranged with their torque-applying portions in substantially opposed parallel relationship so that their points of engagement with their respective sprockets are substantially diametrically opposed, and means for driving the two chains continuously at substantially the same uniform rate in directions to apply their torques in the same sense.

3. Mechanism as in claim 2, wherein the driving means includes a common driving member arranged between the opposed chains and formed with two sprockets arranged one in engagement with each chain.

4. Mechanism as in claim 3, comprising chain guides between which and the freely mounted and driving sprockets the chains are arranged to pass to support the chains against lateral movement under the applied torques.

5. Mechanism as in claim 3, comprising a pair of carrier members freely movable respectively about the axes of the driving and common sprockets, pairs of guide pulleys freely mounted on the carrier members and arranged to constrain the chains to engage the freely mounted and driving sprockets over a fixed arc.

6. Mechanism as in claim 2, wherein the differential gear comprises a pair of bevel gears secured one to each of the sprockets, and a pair of bevel pinions freely mounted on opposed radial shafts on the carrier member and arranged in engagement with said gears.

7. Mechanism for driving a rotatable shaft, comprising a common sprocket member secured to the shaft, a pair of endless chains having torque-applying portions extending in substantially opposed parallel relationship and engaging the common sprocket member at substantially diametrically opposed points to apply torque thereto, a pair of driving sprockets arranged one in engagement with each of said chains, and means for driving the pair of sprockets at substantially the same uniform rate in directions to cause the chains to apply their torques in the same sense, said driving means including a differential gear connecting the two driving sprockets so as to cause the chains concomitantly to apply their torques to the common member.

8. Mechanism as in claim 7, wherein the two chains are arranged in a common plane and the common sprocket member is constituted by a single sprocket.

9. Apparatus for drafting textile fibres in which a series of pairs of driven rollers are arranged for adjustment with a common driving shaft towards and away from the nip of drafting rollers, comprising a pair of movable endless members having torque-applying portions extending in substantially opposed parallel relationship in directions transverse to the axis of the shaft, means for driving said endless members continuously at substantially the same uniform rate, a driving connection so arranged between said torque-applying portions and the shaft as to transmit the torques from the said portions to the shaft in the same sense at substantially diametrically opposed points on the shaft, and a differential gear interacting with the two endless members to cause concomitant application of the torques to the shaft.

10. Apparatus for drafting textile fibres in which a series of pairs of driven rollers are arranged for adjustment with a common driving shaft towards and away from the nip of drafting rollers, comprising a pair of sprockets freely mounted on the shaft, a carrier member secured to the shaft, differential gearing connecting the two sprockets and the carrier member so as to cause concomitant transmission to the shaft of torques applied to the two sprockets, a pair of endless chains each engaging one of said sprockets to apply torque thereto, the chains being arranged with their torque-applying portions in substantially opposed parallel relationship so that their points of engagement with their respective sprockets are substantially diametrically opposed, and means for driving the two chains continuously at substantially the same uniform rate in directions to apply their torques in the same sense.

11. Apparatus as in claim 10, comprising means for adjusting the shaft, while the apparatus is drafting, in a direction transverse to its axis of rotation and parallel to said torque-applying portions, those portions forming a track along which the driven sprockets roll during adjustment of the shaft.

12. Power transmission mechanism comprising, in combination with a rotatable shaft arranged in driving engagement with a series of pairs of rollers constituting part of an apparatus for drafting textile fibres and means for adjusting the shaft and the rollers together in a direction transverse to the axes of the rollers, a pair of sprockets freely mounted on the shaft, a carrier member secured to the shaft, differential gearing connecting the two sprockets and the carrier member so as to cause concomitant transmission to the shaft of torques applied to the two sprockets, a pair of endless chains each engaging one of said sprockets to apply torque thereto, the chains being arranged with their torque-applying portions in substantially opposed parallel relationship so that their points of engagement with their respective sprockets are substantially diametrically opposed, and means for driving the two chains continuously at substantially the same uniform rate in directions to apply their torques in the same sense.

13. Mechanism for driving a rotatable shaft arranged in driving engagement with a pair of intermediate rollers constituting part of an apparatus for drafting textile fibres, the shaft and the rollers being mounted for simultaneous adjusting movement in a direction transverse to their axes, said mechanism comprising a pair of sprockets freely mounted on the shaft, a carrier member secured to the shaft, differential gearing connecting the two sprockets and the carrier member so as to cause concomitant transmission to the shaft of torques applied to the two sprockets, a pair of endless chains each engaging one of said sprockets to apply torque thereto, the chains being arranged with their torque-applying portions in substantially opposed parallel relationship so that their points of engagement with their respective sprockets are substantially diametrically opposed, and means for driving the two chains continuously at substantially the same uniform rate in directions to apply their torques in the same sense.

14. Mechanism for driving a rotatable shaft, comprising a pair of movable endless members having torque-applying portions extending in substantially opposed parallel relationship in directions transverse to the axis of the shaft to be driven, means for driving said endless members continuously at substantially the same uniform rate, and a differential gear so connecting said torque-applying portions and the shaft as to transmit the torque from said portions to the shaft in the same sense at substantially diametrically opposed points on the shaft, the differential gear causing concomitant application of the torques to the shaft.

15. Mechanism for driving a rotatable shaft, comprising a pair of movable endless members having torque-applying portions extending in substantially opposed parallel relationship in directions transverse to the axis of the shaft to be driven, a driving connection so arranged between said torque-applying portions and the shaft as to transmit the torque from said portions to the shaft in the same sense at substantially diametrically opposed points on the shaft, a pair of rotatable members arranged one in driving engagement with each of said endless members for driving said endless members continuously at substantially the same uniform rate, and a differential gear connecting the two rotatable members to cause concomitant application of the torques to the shaft.

16. Mechanism for driving a rotatable shaft, comprising a pair of sprockets freely mounted on the shaft, a carrier member secured to the shaft, differential gearing connecting the two sprockets and the carrier member so as to cause concomitant transmission to the shaft of torques applied to the two sprockets, a pair of endless chains each engaging one of said sprockets to apply torque thereto, the chains being arranged with their torque-applying portions in substantially opposed parallel relationship so that their points of engagement with their respective sprockets are substantially diametrically opposed, means for driving the two chains continuously at substantially the same uniform rate in directions to apply their torques in the same sense, and means for adjusting the shaft in a direction transverse to its axis of rotation and parallel to said torque-applying portions, those portions forming a track along which the driven sprockets roll during adjustment of the shaft.

References Cited in the file of this patent

UNITED STATES PATENTS

| | | |
|---|---|---|
| 745,952 | Barnard | Dec. 1, 1903 |
| 1,497,406 | Robertson | June 10, 1924 |
| 1,557,999 | Farnham | Oct. 20, 1925 |
| 1,649,751 | Prince-Smith et al. | Nov. 15, 1927 |
| 1,711,808 | Rhodes et al. | May 7, 1929 |
| 1,912,946 | Litty | June 6, 1933 |
| 2,047,840 | Twomley | July 14, 1936 |
| 2,168,215 | Keitel | Aug. 1, 1939 |
| 2,179,933 | Heyer | Nov. 14, 1939 |
| 2,208,430 | Ostler | June 16, 1940 |
| 2,346,424 | Griffith | Apr. 11, 1944 |
| 2,624,075 | Bird et al. | Jan. 6, 1953 |

FOREIGN PATENTS

| | | |
|---|---|---|
| 17,814 | Great Britain | of 1906 |
| 642,954 | Germany | Mar. 20, 1937 |